A. Whiteley.
Mower.
No. 358 Reissued Mar. 11. 1856.
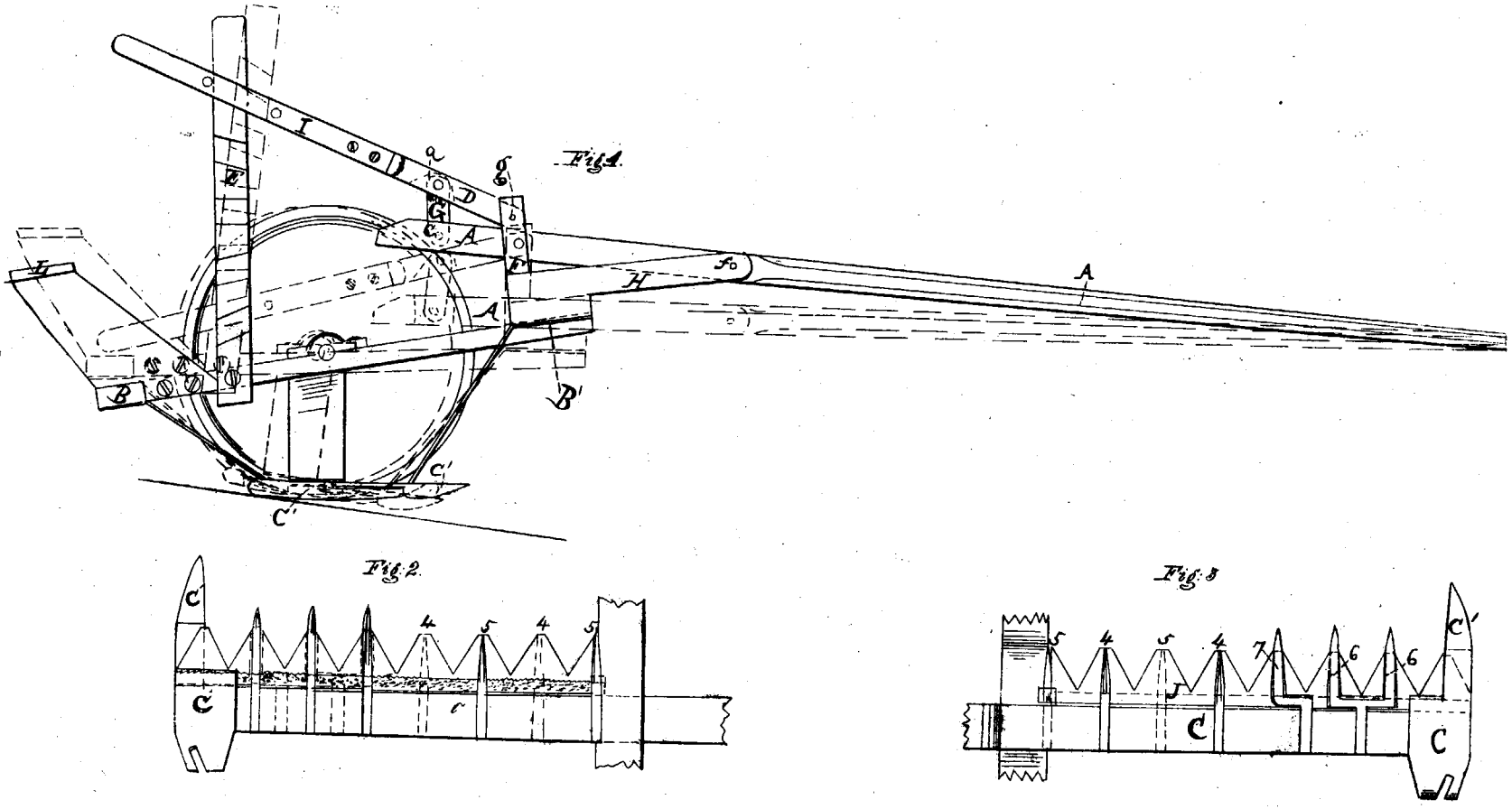

UNITED STATES PATENT OFFICE.

ABNER WHITELEY, OF SPRINGFIELD, OHIO.

IMPROVEMENT IN GRAIN AND GRASS HARVESTERS.

Specification forming part of Letters Patent No. 14,212, dated February 5, 1856; Reissue No. 358, dated March 11, 1856.

*To all whom it may concern:*

Be it known that I, ABNER WHITELEY, of Springfield, in the county of Clarke and State of Ohio, have invented new and useful Improvements in Grain and Grass Harvesters; and I do hereby declare that the following is a full, clear, and exact description of the same, reference being had to the annexed drawing, forming part of this specification.

In using mowing-machines it has ever been apparent to even the unskilled that one of the greatest difficulties to their successful use has been the liability to injury by bringing the fingers or guards and cutters in contact with obstructions that would injure or ruin them, and to obviate this difficulty innumerable methods have been tried. The one which admits of raising and lowering the finger-piece, cutters, &c., to and from the ground at the will of the operator, as set forth and embraced in the patent of Jonathan Haines, in 1849, is one of the most prominent; but this was very defective, as the finger-piece was placed some distance forward of the wheels which sustained it, and consequently the height of the stubble was determined by the wheels, and not by the finger-piece resting on the ground. Thus the cutters sometimes cut at the top and sometimes at the bottom of the grass, and sometimes, when the ground is very uneven, run over the top of the grass, and at other times would run into the ground. Thus it was ascertained that this was too defective to give anything like satisfaction. The most important mode, and one that has long been in use, even from the earliest application of machines to cutting grass, is one that consists in changing the angle of the fingers and cutters to the ground, and when it was desired to cut grass on a meadow that was perfectly smooth and produced fine soft grass the finger-piece and frame were so adjusted as to bring the plane of the fingers and cutters about into the horizontal plane, and sometimes, when very close cutting was desired, to give the points of the fingers and cutters a dip toward the ground; and when it was desired to mow very rough meadow, wherein gravel, craw-fish nests, small stones, or lumpy ground abounds, the points of the fingers and cutters have been raised up, so as to give them any desired angle to the horizontal plane for the purpose of making them self-acting in passing over any obstruction that came below the point of the fingers, or anything the angle of which does not exceed the angle of the fingers. All of these various changes were made by stopping the team and adjusting the parts and then securing them in a fixed position, there to remain rigid until necessity required another change, which again required the same loss of time. Now, this was far better adapted to mowing than the former, inasmuch as the heel of the finger-piece in this case rested on the ground, forming a gage for the height of the stubble; but it was soon found that this plan had serious defects, some of which are the following: In many meadows there is a variety in the kinds of land as also in the kinds of grass. Some of the finest meadows in the world have strips of moist land in which craw-fish nests abound. Now, when the machine is set to cut the fine grass close to the ground, and it has to pass through the moist strips, cutting through the craw-fish nests ruins the edge, so that it will not cut at all; and if it is set, as described, to run over the craw-fish nests and other obstructions, as described, it will cut so high that it will leave a large portion of the fine grass on the drier land and will run entirely over lodged grass if it lies close to the ground.

Now, this improvement is designed to obviate all these difficulties by changing the angle of the cut at any time, when desired, while the machine is in motion, and fixing it in any desired position without removing the finger-piece off the ground. Now, as this, when once understood, can be accomplished in various ways on different machines, I shall not confine myself to any particular machine nor to any particular arrangement, but will describe the manner of producing the result in one case and the arrangement necessary to produce the desired result in this particular case and on this particular kind of machine.

In constructing this machine I connect the main frame, from which the finger-piece is suspended, and tongue with a flexible joint, in connection with attaching the finger-piece carrying the fingers and cutters to said frame, in such manner that the finger-piece and cutters lie on the ground in or nearly in the vertical plane passing through the master-wheel shaft, so that when the end of the frame at said joint is elevated it will move the finger-piece forward and elevate the points of the fingers and cutters without moving the finger-piece off the ground; and when said joint is depressed the finger-piece will move backward and the points of the fingers and cutters will descend close to the ground again, and also provide means for elevating and depressing the front end of said frame, at the option of the driver, while the team is in motion. Now, it will be observed that this elevating of the points of the fingers and cutters causes them to ascend and pass over obstructions with ease, while at the same time the rear of the finger-piece resting on the ground forms a gage for the height of the stubble and adapts it to the unevenness of the ground, causing it to cut the stubble of a uniform height. This adjustment becomes necessary in mowing meadows where strips of moist land occur wherein craw-fish nests abound, as described; and from the gravel therein it is necessary to avoid as far as possible cutting into them, and when that cannot be avoided, and the top of the nest must be passed through, the evil may be abated by the inclined position of the finger-piece, which passes the gravel and clay of the nest quickly off the blades, instead of leaving it thereon until ground up and the edges of the blades ruined; and to further secure said blades from injury and render the cutting more easy and certain, I make the tops or caps of the guards wider than the lower portion of the same, and so wide as to prevent any gravel or small stones that may come into the cut to drop out of the cut without being brought against or supported by the lower part of the guard. I can thus cut over with ease and safety not only the above but other obstructions—as clods of earth, stones, &c.—at the will of the driver while the machine is in motion, and also throw the cutters and fingers down and cut good and clean grass close to the earth. This could not be done if the machine did not admit of an immediate adjustment without stopping the team.

In the drawings, A is the tongue, passing through an upright slot in F, placed on the front portion, B, of the main frame B B′, and extends back to a point near the line of the master-wheel shaft. The tongue A is pivoted at *f* in the jaws or hounds H.

E is an upright, rising on the main frame between the front and rear portions of B B, and it is furnished with holding-notches for retaining the lever D. This lever is pivoted in F at *g*. C is the finger-piece, connected in the usual manner with the frame B B′, and carries the fingers and cutters in common mode. The lever D has a spring, I, secured on its outside, which operates a staple passing through it and around the upright E, which spring and staple secure the lever D in the notches in E.

G is a metal or wooden bar connecting the ear end of the tongue and the lever D together, and is pivoted in A at *c* and in D at *b*. Now, from the manner in which the lever D and tongue A are pivoted and connected, when the lever D is depressed it will depress the front end of the frame B, and with it the points of the fingers and cutters, and the rear, B′, will ascend and is held in any desired position by the notches in E, and by elevating the lever D the reverse will be produced.

C is the shoe or divider.

J is the cutter.

K is the cutter-bar, which is made a rasp on the side opposite that on which the cutters are secured.

4 4 are upper side fingers, and 5 5 are the opposite, and are alternately placed with 4 4, and having their points terminate at the points of the blades.

6 6 is a double cap or top of two guards, and have their edges extending over the edges of the bottom portions of the same. 7 is a single one, made similar to the double one.

In noticing the changes of position that the shoe, the cutter, and the fingers assume it must be borne in mind that the front end of the tongue is the stationary point.

In the drawings the extreme elevation of the point of the shoe is shown, also the position of D at the top of E, together with the position of all the parts, and in red line is shown the greatest depression of the point of C′, with the lever D locked down on the frame B B′, together with the position of all the parts, and it will be readily understood how the intermediate changes may be made, as well as the facility given the driver, when seated on L, to quickly raise or depress the rear end of the lever D and effect the desired changes in the position of the finger-piece, cutters, &c.

Having thus described my improvement, what I claim as my invention, and desire to secure by Letters Patent, is—

1. Changing the angle of the fingers and cutters of reaping and mowing machines while the machine is in motion and the finger-piece resting on the ground, as described, and for the purposes set forth.

2. I do not here claim oscillating the finger-piece about an axis within itself, irrespective of the relations between the main frame and the master-wheel shaft; but I do claim so constructing the machine as described or otherwise, the result being substantially the same, that the driver is enabled, while the team is in motion and the boxes of the master-wheel shaft being rigidly connected with the main frame, to change the angle of the fingers and cutters without moving the finger-piece from the ground.

ABNER WHITELEY.

Witnesses:

A. D. COOMBS,

THOS. V. CLARKE.